Patented June 29, 1943

2,323,129

UNITED STATES PATENT OFFICE 2,323,129

CONDENSATION PRODUCT OF FORMALDEHYDE AND A TERPENE ALCOHOL AND A PROCESS OF MAKING IT

Mortimer T. Harvey, East Orange, N. J., assignor to Harvel Research Corporation, a corporation of New Jersey No Drawing. Application January 20, 1939, Serial No. 251,945

4 Claims. (Cl. 260—598)

The present invention relates to condensation products of pine oil and formaldehyde and to methods and steps of making the same.

Orlov, German Patent 191,011 has condensed pine oil with paraform with the aid of acid and Ushakov and Sokalov, Chemical Abstracts, 1930, 24, page 3796 have condensed pine oil with formaldehyde with the aid of acid, but in both these cases polymerization of the pine oil takes place and the reaction products are dark colored and are pitch-like and brittle in consistency.

It is an object of the present invention to produce light colored condensation products of pine oil and formaldehyde with substantially no polymerization of the pine oil.

Other objects and advantages of the present invention will appear from the following description of the invention, from the illustrative examples given and from the claims forming part thereof.

Various pine oils obtainable on open market are suitable for the practice of the present invention, but the following specification of a particular steam distilled pine oil is given as an illustrative example:

| | | |
|---|---|---|
| Terpene hydrocarbons | Alpha pinene<br>Beta pinene<br>Dipentine<br>Limonene<br>Gamma terpine<br>Terpiniolene<br>Camphene | Approx. 5% |
| Hydroxy hydrocarbons | Alpha terpineol<br>Beta terpineol<br>Fenchyl alcohol<br>Borneol | Approx. 70%<br>Approx. 10% |
| Oxide hydrocarbons | Cineol<br>Methyl-chavical | Approx. 5% |

General Naval Stores Co.
90 West Street,
New York, N. Y.

The above example of a specification of a particular pine oil on the market is not to be limited in nature particularly in view of the fact that it is made of a multiplicity of ingredients and the claims hereof are considered and intended to be broad enough to read on any of the commercial pine oils and also to cover the terpineols, both the alpha, beta and gamma, and fenchyl alcohol, borneol and cineol and mixtures of any thereof. The compounds reacted with formaldehyde, in water solution, according to the present invention can be generally classified as alicyclic alcohols.

According to the present invention formaldehyde is condensed with an alicyclic alcohol; terpineol, for example, is condensed with formaldehyde and substantial polymerization of the alicyclic alcohol is avoided by presenting the formaldehyde in water solution to the alicyclic alcohol, the reaction being carried on by the aid of heat and of the presence of an acid. The presence of water during the reactions prevents any substantial polymerization of the alicyclic alcohol, even though the acid used, such as sulphuric acid, is one which can be employed for polymerizing an alicyclic alcohol such as terpineol.

The reactions products of the present invention are liquids which are light colored, ranging in color from water white to amber color, and of comparatively low viscosity. They can be thickened by heat to increase their viscosity but such thickened products are not the same as those of the known prior art in which the products are very dark or black in color and are from a very thick and viscous ropy condition to a hard brittle state and are the result of acid polymerization of pine oil before or during reaction with formaldehyde. The liquid reaction products of the present invention are solvents for cellulose acetate, cellulose nitrate, glycerol-phthalic acid condensation products, shellac, "Tornesite" (chlorinated rubber), drying oils such as linseed oil and China-wood oil, ester gums and are soluble in varnishes made from linseed oil, Chinawood oil, ester gums and so on and are insoluble in water.

Depending on the amount of formaldehyde condensed with the alicyclic alcohol, the products of the present invention have boiling points ranging above and below 200° C. at 4 cm. of mercury. The condensation products of the present invention can be separated by distillation and can be used separately or they can be used together. On distillation at atmospheric pressure a small proportion will come over at about 105° C. after which the boiling temperature jumps up to about 190° C. and fractions will come off up to about 320° C. at about which temperature a clear light colored liquid residue is left which will not distill over as such but will darken and be destructively distilled. Instead of distilling at atmospheric pressure distillation can be carried on at reduced pressure, for example at a pressure of four centimeters of mercury at which pressure the clear liquid, which is a residue at 320° C. at atmospheric pressure, is a residue at above about 200° C. This clear residue has a specific gravity of from about 1.09 to about 1.1 at 15° C. and varies in amount of yield depending on the proportion of formaldehyde (in water solution) reacted with the alicyclic alcohol (e. g. terpineol per se or pine oil) and appear as a resultant product whatever proportions are used of the two reagents.

Illustrative examples of the practice of the present invention and of the reaction products are as follows.

*Example 1.*—About one mol of steam distilled pine oil and three mols of formaldehyde (37% solution in water), as reagents, and concentrated hydrochloric acid in amount about five tenths of one per cent of the weight of the said reagents are heated under a reflux condenser for about three hours at which time the odor of formaldehyde has disappeared. The condensation product appears as a light colored liquid layer under the water which comes from the formaldehyde solution and which is formed during the condensation of the pine oil and formaldehyde. The specific gravity of this water insoluble liquid reaction product taken as a whole is 1.066 at 15° C., that of the pine oil used as reagent was 0.940. The yield was about ninety per cent of the theoretical yield for condensation of pine oil and formaldehyde.

This liquid reaction product was washed free of acid and then distilled at 4 cm. of mercury and carried on until a temperature of about 200° C. was reached, about forty per cent coming over up to and at this temperature. The residue was clear, amber colored and had a specific gravity of about 1.09 to about 1.1 at 15° C. This distillate was clear and light colored, and was composed of about 25% water and about 75% of a mixture of pine oil and condensation products of pine oil with lower multiples of molecular equivalents than in the said distillate residue.

It appears that the said distillate residue is a condensation of a mole of pine oil with higher multiples of molecular equivalents of formaldehyde, from about three to about five moles, and this is indicated by the fact that the distillate itself will condense with further quantities of formaldehyde as shown by the following example.

*Example 2.*—About 200 parts by weight of the said distillate of Example 1 above, without the water of the distillate, and about 340 parts of 37% formaldehyde solution, as reagents, and five tenths of one per cent of their weight of concentrated hydrochloric acid are heated under a reflux condenser for about six hours or until odor of formaldehyde is not detected. A water insoluble reaction product similar to that of Example 1 is produced and it has a specific gravity of about 1.066 at 15° C. Upon distillation at 4 cm. of mercury the distillate residue remaining at 200° C. is sixty per cent of the said water insoluble reaction product. Said distillate residue has a specific gravity of about 1.09 to about 1.1 at 15° C. and is considered to be the same product as said distillate residue of Example 1, wherefore the total yield of this product is about 80% of total theoretical.

*Example 3A.*—A mol of steam distilled pine oil and three mols of commercial formalin, water solution of formaldehyde (about 37.5%); with about one-half per cent (0.5%) of the total weight of the pine oil and the formalin of concentrated sulphuric acid in an equal volume of water, as condensing agent. 12 lbs 8 ounces of steam distilled pine oil, about 20 lbs. 6 ounces of 37.5% CH2O solution, and about 47 c. c. conc. H2SO4 (C. P.) on 47 c. c. of water, are reacted as follows. The water solution of sulphuric acid is added to the formaldehyde solution, after which the steam distilled pine oil is added, and the mixture heated under a reflux condenser. At the beginning and for several hours during the heating the pine oil floats on the formaldehyde solution, but after about six or seven hours a reaction takes place whereby an oily liquid reaction product is formed which goes to the bottom of the container with the water present floating in it. The heating is then discontinued and the whole is neutralized by the addition of about 130 grams of NaOH dissolved in 230 grams of water. The neutralized material is cooled and the bottom oil layer is siphoned off. This material is hereinafter called condensation product 3A.

B. About fifty (50) parts by weight of condensation product 3A and seventeen (17) parts by weight of maleic anhydride were heated under a reflux condenser for about one hour, at 150° C. The reflux condenser was then removed and the temperature raised to about 250° C and held there for about fifteen (15) minutes and then cooled. A condensation reaction took place whereby was produced a product, hereinafter called condensation product 3B, which was thicker than condensation product 3A and was of about the consistency of new honey This product can be thickened by continued heating through various stages of thickness to a hard rosin like consistency when cool.

Condensation product 3B is suitable by itself and also with other materials for making surface coating, impregnations and for general use. For example, the condensation product 3B, in amount resulting from the method of 3B, fourteen and four-tenths (14.4) by weight of glycerol and forty-six and one-half (46.5) parts of water white rosin are added and the whole heated up and held at about 250° C. for about fifteen (15) minutes, (to form a hard bottom when cold). The mixture at this point was chilled back with one hundred and ten parts (110) of ester gum, and the temperature held at about 200° C. for about five minutes. This product, hereinafter called product 3B2, is soluble in linseed oil and is suitable for use whenever ester gums, rosin and resins generally are used for making surface coating, impregnations and for general use. In this latter example it is considered that one —OH radicle of the glycerol reacts with one mol of the resin and two —OH radicles of the glycerol react with two carboxyl groups of the maleic anhydride.

*Example 4B.*—About 120 parts by weight of product 3A, described above, and 49 parts of maleic anhydride are heated under a reflux condenser for about two hours, after which about forty-six (46) parts of glycerol and about one hundred and thirty (130) parts of rosin are added and the whole heated under vacuum, first for about one and one-half hours at about 150° C., then for about 1½ hours at about 210° C., and finally for about one-quarter hour at about 240° C. In a receiver connected in the vacuum system about 18 parts by weight of water and about 16 parts of a light volatile oil are caught. The condensation product of the reaction is a dry, hard and pale resin.

From the above it can be seen that the formaldehyde can be reacted in various amounts with the pine oil (alicyclic alcohol) and that it can be added to the pine oil in steps with a removal of the water between steps whereby the time of reaction is reduced.

The reaction product made by using the ultimate amount of formaldehyde that the pine oil will take up under the reaction conditions above set forth can be separated from the other reaction products and other materials and used by itself. Also various reaction products, that is condensation products of alicyclic alcohol condensed with various amounts of formaldehyde, can be used together.

It is again noted that the condensation reaction products of the present invention are characterized by the fact that the minimum amount of polymerization of the alicyclic alcohol takes place. As pointed out above it can be seen that the condensation reaction without substantial polymerization is possible because of the use of acid condensation agent in small quantities, or in greatly diluted condition. Other illustrative examples of suitable acid for this purpose are sulphuric acid and chlor acetic acid. For example when using sulphuric acid it can be used in amount which is 1 to 2% by weight of the pine oil and formaldehyde, and the chlor acetic acid can be used in amount which is about 5% of the reagent materials.

These are not limiting examples but the quantities used are those which will produce condensation reaction without substantial polymerization.

The present application is a continuation in part of my copending application Serial Number 238,813, filed November 4, 1938, which in turn is a continuation in part of my application Serial Number 202,361, filed April 15, 1938.

Having thus described my invention, what I claim and desire to protect by Letters Patent is:

1. An organic liquid which is obtained by the heat condensation of formaldehyde in aqueous solution and a monomeric terpene alcohol in contact with an acid catalyst, which organic liquid has a boiling point above 200° C. at 4 cm. of mercury and which has a specific gravity of about 1.09 to about 1.1 at 15° C.

2. A liquid organic condensation product, capable of dissolving cellulose nitrate, obtained by heating a mixture of pine oil, formaldehyde in aqueous solution and an acid catalyst, the mole ratio of said formaldehyde to said catalyst being between about 3 to .01 and 1 to .1.

3. The method for producing a liquid organic condensation reaction product, capable of dissolving cellulose nitrate, comprising heating one mole of pine oil together with from 1 to 3 moles of formaldehyde in aqueous solution in contact with from about 0.01 mole to about 0.1 mole of acid selected from the group consisting of hydrochloric acid, sulphuric acid and monochloracetic acid.

4. A liquid organic condensation reaction product, capable of dissolving cellulose nitrate, obtained by heating one mole of pine oil together with from 1 to 3 moles of formaldehyde in aqueous solution in contact with from about 0.01 to about 0.1 mole of acid selected from the group consisting of hydrochloric acid, sulphuric acid and monochloracetic acid.

MORTIMER T. HARVEY.